United States Patent
Munetoh

(10) Patent No.: US 8,521,916 B2
(45) Date of Patent: Aug. 27, 2013

(54) METHOD AND SYSTEM FOR CONNECTING A HOST AND MULTIPLE STORAGE DEVICES FORMED BY OPTICAL INTERCONNECTS AND OPTICAL LINK CREATION METHOD

(75) Inventor: Seiji Munetoh, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/944,803

(22) Filed: Nov. 12, 2010

(65) Prior Publication Data
US 2011/0119408 A1    May 19, 2011

(30) Foreign Application Priority Data
Nov. 18, 2009   (JP) .................................. 2009-262669

(51) Int. Cl.
*G06F 3/00*     (2006.01)
*G06F 13/00*    (2006.01)

(52) U.S. Cl.
USPC ................................ 710/14; 710/38; 710/300

(58) Field of Classification Search
USPC .............................................. 710/14, 38, 300
See application file for complete search history.

(56) References Cited

U.S. PATENT DOCUMENTS

| | | | | |
|---|---|---|---|---|
| 5,896,492 A | * | 4/1999 | Chong, Jr. .......................... | 714/3 |
| 2008/0010682 A1 | * | 1/2008 | Hamid ............................. | 726/24 |

FOREIGN PATENT DOCUMENTS

| | | |
|---|---|---|
| JP | 63205616 A | 8/1988 |
| JP | 02-263251 A | 10/1990 |
| JP | 02-294723 A | 12/1990 |
| JP | 10-207782 A | 8/1998 |
| JP | 11-006936 | 1/1999 |
| JP | 2001-166177 | 6/2001 |
| JP | 2002-007220 A | 1/2002 |
| JP | 2005249991 A | 9/2005 |
| JP | 2007-328599 A | 12/2007 |
| JP | 2008-217727 | 9/2008 |

OTHER PUBLICATIONS

"Fibre Channel—Wikipedia, the free encyclopedia", Jan. 20, 2009, http://web.archive.org/web/20090120062745/http://en.wikipedia.org/wiki/Fibre_Channel.*

* cited by examiner

*Primary Examiner* — Farley Abad
(74) *Attorney, Agent, or Firm* — Eustus Nelson; Michael J. Chang, LLC

(57) ABSTRACT

A connection scheme for connection from a host or the like to multiple storage devices via an optical link, and in particular to an optical connection scheme or an optical wiring scheme for realizing multiplexing/redundancy by utilizing branches of an optical link and the unidirectionality of the optical link. When a host or the like and multiple storage devices such as memories are optically connected via two or more optical couplers, a configuration is made in which a loop is provided between the two optical couplers by utilizing branches of the optical couplers and the unidirectionality of light. Accordingly, a configuration is adopted in which an IO controller makes a selection from among multiple operation modes.

13 Claims, 6 Drawing Sheets

METHOD AND SYSTEM FOR CONNECTING A HOST AND MULTIPLE STORAGE DEVICES FORMED BY OPTICAL INTERCONNECTS AND OPTICAL LINK CREATION METHOD

CROSS REFERENCE TO RELATED APPLICATION

This application claims priority under 35 U.S.C. 119 from Japanese Application 2009-262669, filed Nov. 18, 2009, the entire contents of which are hereby incorporated by reference.

BACKGROUND OF THE INVENTION

1. Field of the Invention

The present invention relates to a connection scheme for a host or the like to multiple storage devices via an optical link, and in particular to an optical connection scheme or an optical wiring scheme for realizing multiplexing/redundancy by utilizing branches of an optical link and the unidirectionality of the optical link.

2. Description of Related Art

At present, a scheme using an optical link that has attracted attention is a scheme for a connection between a host, such as a CPU and a storage device such as memory. System reliability (RAS) is important for servers, and recently even for personal computers. A system configuration of storage devices, such as memories, including those based on ECC (Error Correcting Code) and other RAIDs such as RAID for mirroring (RAID 1), are prepared to support multiplexing or redundancy thereby.

From a host, such as a CPU, a data read command or a data write command is given to storage devices such as memories. In general, when processing in accordance with the commands is executed, an input/output (IO or I/O) controller included in the storage devices or externally attached to the storage devices is used. That is, the IO controller is responsible for determining how the command given from the host is to be interpreted and how the storage device is to be operated.

In the case where a fault occurs (generally, unexpectedly) at any position among the multiple storage devices, an operation of recovering the fault is performed by using multiplexed/redundant fault tolerance. In this recovery operation, the IO controller is generally responsible for this role. In the case of RAID, a part called a RAID controller is responsible for the role, and the operation can be called "rebuild of data" because of the purpose of the recovery operation. Therefore, it is conceivable that efforts will be made to enhance the functions of this IO controller. However, in a situation in which multiple storage devices are connected by electrical wiring or electrical links, the shortening of recovery time is restricted.

The following patent literatures will be described below as they relate to the present invention:

Patent Literature 1: Japanese Published Unexamined Patent Application No. 2008-217727
Patent Literature 2: Japanese Published Unexamined Patent Application No. 2001-166177
Patent Literature 3: Japanese Published Unexamined Patent Application No. H11-6936

In Patent Literature 1, the copying speed of a copying operation between memory devices in a memory mirroring configuration is changed. However, since the change is on the assumption of electrical connection, the burden on a memory control apparatus or a mirroring control apparatus becomes complicated.

Patent Literature 2 describes a branching apparatus for branching an inputted optical signal. This literature demonstrates a general technical knowledge of the branching of light.

Patent Literature 3 relates to a method for manufacturing an optical fiber coupler (2×2 optical fiber coupler), and shows a general technical level of enabling such manufacture and describes an optical communication system using the optical fiber coupler. However, the terminal part of one end of the 2×2 optical fiber coupler is assumed to be an unnecessary port, and the unnecessary port is not utilized. This 2×2 optical fiber coupler can be called an X-type coupler because of the characteristics of its external appearance.

BRIEF SUMMARY OF THE INVENTION

To overcome these deficiencies, the present invention provides a connection scheme from a host to multiple memory devices via an optical link including: a host, including a transmitting end for transmitting commands and a receiving end for receiving commands; two or more optical couplers, wherein a first optical coupler has a third branch that is optically linked to the receiving end of the host and a fourth branch that is optically linked to a second branch of a second optical coupler, wherein said second optical coupler also has a first branch that is optically linked to the transmitting end of the host; two or more IO controllers, each including a transmission end and a receiving end, wherein the transmission end of the first IO controller is optically linked to a first branch of the first optical coupler, the transmission end of the second IO controller is optically linked to a second branch of the first optical coupler, the receiving end of the first IO controller is optically linked to a third branch of the second IO controller, and the receiving end of the second IO controller is optically linked to a fourth branch of the second optical coupler; and two or more memory devices each connected to one of the controllers via an input and an output.

In another aspect, the present invention provides a method for connecting a host to two or more IO controllers within two or more memory units through optical couplers via optical links, the method including: connecting via an optical connection a receiving end of the host and a third branch of a first optical coupler, a fourth branch of the first optical coupler and a second branch of a second optical coupler, and a first branch of the second optical coupler and a transmission end of the host; connecting via an optical connection a transmission end of a first IO controller to a first branch of the first optical coupler; connecting via an optical connection the transmission end of the second IO controller to a second branch of the first optical coupler; connecting via an optical connection the receiving end of the first IO controller to a third branch of the second IO controller; connecting via an optical connection the receiving end of the second IO controller to a fourth branch of the second optical coupler; and connecting two or more memory devices to one of the two or more IO controllers via an input and an output.

In yet another aspect, the present invention provides an optical link creation method including: preparing a first, second, and third fibers with the same length; fusing a first portion at a first distance from one end of the first fiber and the first position at the first distance from one end of the second fiber, whereby the distance from the end to first position is the same for both the first and second fibers; and fusing a second position at a second distance from one end of the second fiber, which is different from the first position of the second fiber, and the second position at the second distance from one end of the third fiber, whereby the distance from the end to second position is the same for both the first and second fibers.

DETAILED DESCRIPTION OF THE PREFERRED EMBODIMENTS

Figure 1:
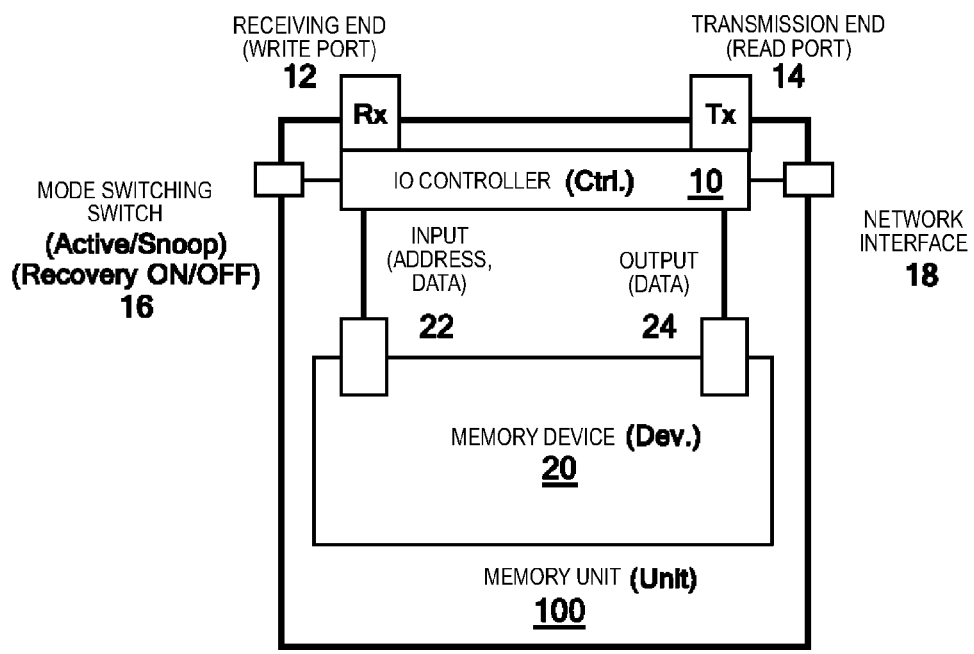
FIG. 1 is a diagram showing the configuration of a memory unit used in the present invention.

FIG. 1 is a diagram showing the configuration of a memory unit used in an embodiment of the present invention. A memory unit (hereinafter, also referred to as an abbreviation, Unit) 100 includes an IO controller (hereinafter, also referred to as an abbreviation, Ctrl.) 10 and a memory device (hereinafter, also referred to as an abbreviation, Dev.) 20 as its main components. The IO controller 10 controls data specification in the memory device 20 as well as an address where the data is stored, via an input 22 of the memory device 20. The IO controller 10 also controls the outputting of data in the memory device 20 via an output 24 of the memory device 20.

In addition to the memory device 20, the IO controller 10 also controls an optical interconnect. In an embodiment of the present invention, multiple operation modes can be set for the memory unit 100. It is also possible to control the memory device via a mode switching switch 16 of the body of the memory unit 100, as well as via a network connection to be made through a network interface 18, or via an optical link itself.

In an embodiment of the present invention at least three kinds of operation modes can be set for the IO controller 10. Specifically, in accordance with a read command (also expressed in an abbreviation, Cmd) or a write command given from (the transmission end of) a host, selective transition is possible between the states of (1) and (2) and between the states of (2) and (3), among the following (at least) three kinds of states:

(1) a state for executing the reading of data from a memory in response to a read command and executing the writing of data to a memory in response to a write command (Active Mode), (2) a state for not responding to a read command but executing only the writing of data to a memory in response to a write command (Snoop Mode), and (3) a state for executing the writing of data to a memory in response to a write command, and converting a read command to a write command to execute the writing of data to a memory (Recovery Mode).

These at least three kinds of operation modes and selective transitioning among them can be realized as the functions of the IO controller 10 itself. However, the IO controller 10 can be included in the memory unit 100 as in the embodiment of FIG. 1; or in another embodiment, corresponding functions of the IO controller 10 can be realized as being externally attached to the memory unit 100 (this case is not shown).

At a receiving end (Rx) 12, a read command or a write command can be received via this receiving end 12. Furthermore, at this receiving end (Rx) 12, it is possible to receive both data and information such as an address. On the basis of which address in the memory device 20 data should be written and at which address in the memory device 20 data should be read, the memory device 20 is caused to operate. A receiving end (Rx) can be called a write port or an input channel (In) because of the unidirectionality of light.

At a transmission end (Tx) 14, data is outputted from a memory device in accordance with a read command through this transmission end 14. A transmission end (Tx) 14 can be called a read port or an output channel (Out) because of the unidirectionality of light.

Figure 2:
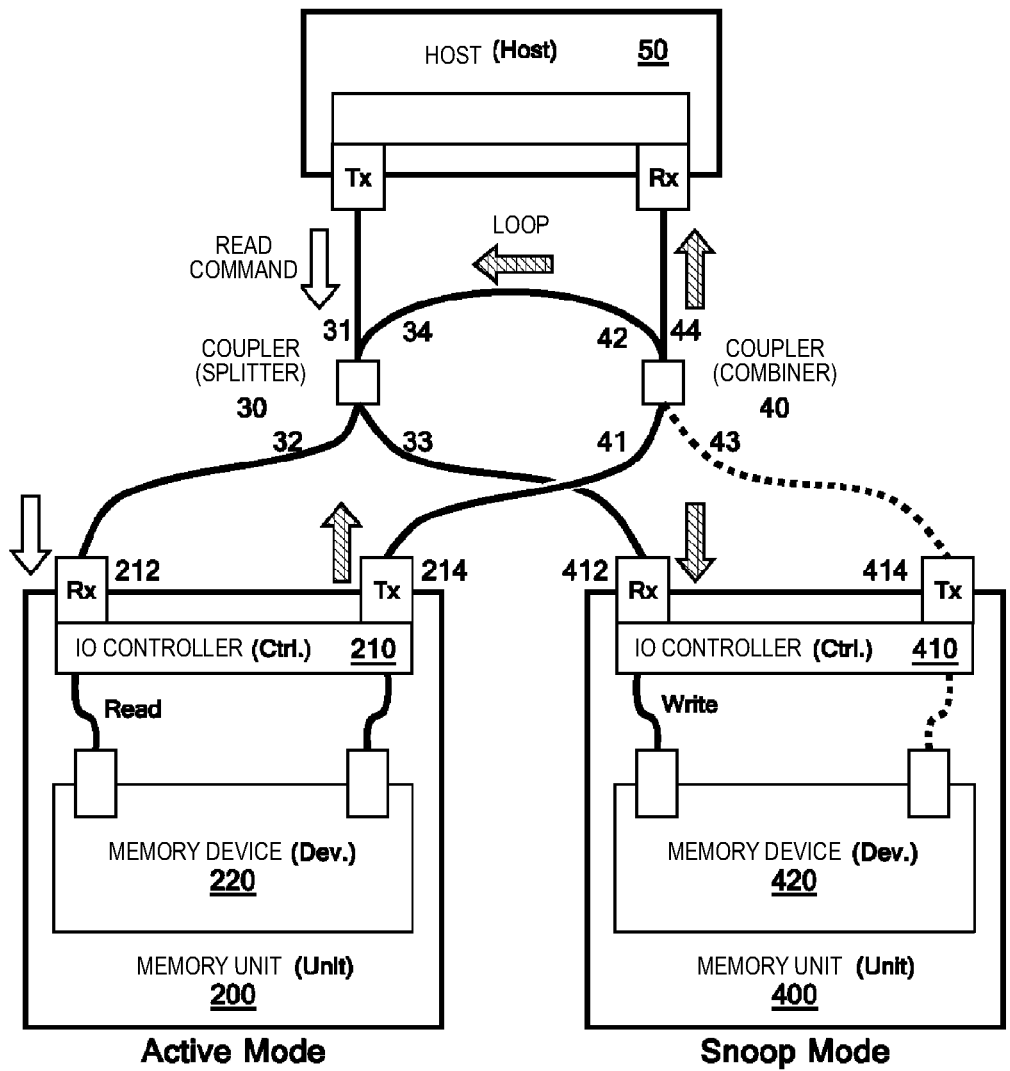
FIG. 2 is a diagram showing an example of a connection between multiple memory units and a host in accordance with the present invention.

FIG. 2 is a diagram showing an example of connections between multiple memory units and a host in accordance with the present invention. A memory unit 200 and a memory unit 400 are in the same configuration as the memory unit 100 in FIG. 1, having IO controllers 210 and 410, and memory devices 220 and 420. What is shown as a host 50 in FIG. 2 only conceptually indicates the functions corresponding to a CPU for giving a command to the multiple memory units (a part where the functions exist). It is sufficient if what is shown as the host 50 is constructed in such a relationship that a command can be transmitted/received via multiple optical interconnects between the host 50 and the memory unit 200 and between the host 50 and the memory unit 400. Hereinafter, such a concept will be also expressed as Host.

Writing from the host 50 is simultaneously distributed to a receiving end (Rx) 212 of the memory unit 200 and a receiving end (Rx) 412 of the memory unit 400 via a coupler 30. As for reading from the memories, only a memory unit in the Active Mode state (the state of (1)) outputs data from its transmission end (Tx) to the host 50. In the case of FIG. 2, only the memory unit 200 is in the Active Mode state and the memory unit 400 is in the Snoop Mode state (the state of (2)). Therefore, data is outputted only from a transmission end (Tx) 214 of the memory unit 200, and data is not outputted from a transmission end (Tx) 414 of the memory unit 400 (the data that is not outputted is schematically indicated by using a broken line).

In FIG. 2, multiple optical interconnects are formed via two couplers 30 and 40. Both of the couplers are X-type couplers. They include both ends, are capable of unidirectionally transmitting light from the one end side to the other end side, and include two or more optical interconnect branches on both end sides.

Because of the nature described above and the optical interconnect connection relationship, both of the X-type couplers have the natures of an optical X-type coupler due to the unidirectionality of light. One coupler 30 between the two optical couplers is responsible for a role as a splitter, and the other coupler 40 between the two optical couplers is responsible for a role as a combiner.

The coupler 30 responsible for the role as a splitter includes both ends, includes a first branch 31 and a second branch 34 at one end and includes a third branch 32 and a fourth branch 33 at the other end.

The coupler 40 responsible for the role as a combiner includes both ends, includes a first branch 41 and a second branch 43 at one end and includes a third branch 44 and a fourth branch 42 at the other end.

It is to be noted that a "loop" is formed which returns from the fourth branch 42 of the coupler 40 responsible for the role as a combiner to the second branch 34 of the coupler 30 responsible for the role as a splitter.

Data read from the transmission end (Tx) 214 is interconnected so that it is fed back to the receiving end (Rx) 212 and the receiving end (Rx) 412.

That is, due to the existence of this "loop", data read from a memory device is interconnected so as to be fed back to each of the input channels (Rx) of the IO controllers 210 and 410, and, by performing writing to a newly added memory unit, the memory can be copied.

In other words, information that would have been conventionally discarded at the fourth branch 42 of the coupler 40 is recycled by a loop. Furthermore, this characteristic interconnected wiring pattern itself can be said to take over the functions of the IO controllers.

Figure 3:
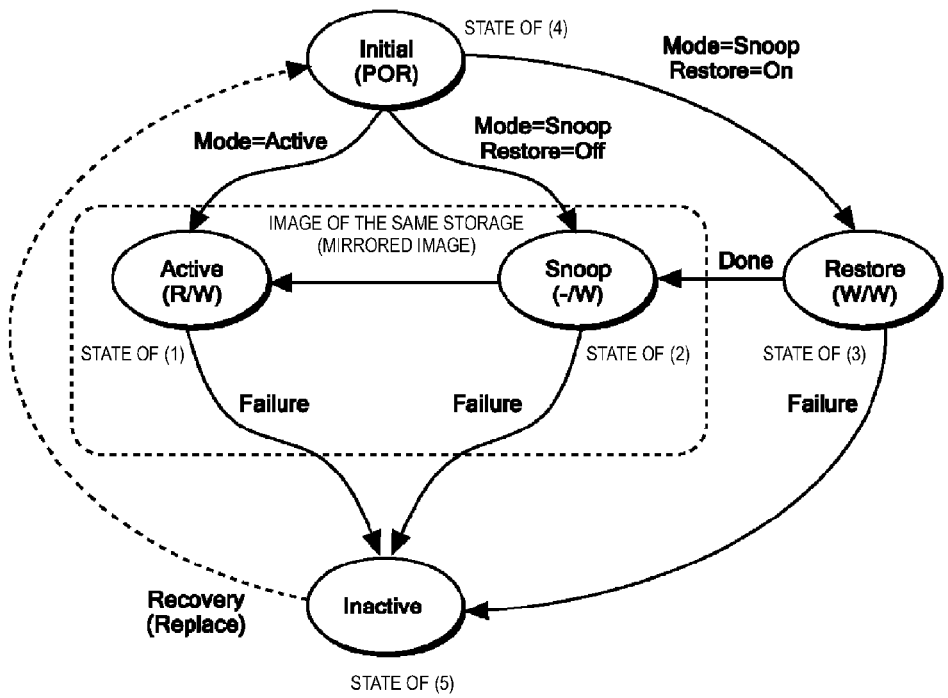
FIG. 3 is a schematic diagram showing three kinds of states (operation modes) according to the present invention, and transitions among the states.

FIG. 3 is a schematic diagram showing three kinds of states (operation modes) according to the present invention and transitions among the states. Specifically, in accordance with a read command or a write command given from (the transmission end of) a host, selective transition is possible between the states of (1) and (2) and between the states of (2) and (3), among the following (at least) three kinds of states:

(1) a state for executing the reading of data from a memory in response to a read command and executing the writing of data to a memory in response to a write command (Active Mode), (2) a state for not responding to a read command but executing only the writing of data to a memory in response to a write command (Snoop Mode), and (3) a state for executing the writing of data to a memory in response to a write command, and converting a read command to a write command to execute the writing of data to a memory (Recovery Mode).

In FIG. 3, since the state of (1) responds to both a read command and a write command, the state is expressed as (R/W) using the initials of the commands. Since the state of (2) does not respond to a read command, the state is expressed as (–/W) in which (–) indicates that the state does not respond to a read command. Since the state of (3) converts a read command to a write command, the state is expressed as (W/W).

Selective transition between the states of (1) and (2) can be realized through the mode switching switch 16, the network interface 18 or the like in FIG. 1.

Selective transition between the states of (2) and (3) can also be realized through the mode switching switch 16 or the like in FIG. 1. For example, by regarding the state of (3) as a derivative of the same Snoop Mode state as the state of (2), it is possible to cause the state to transition to the state of (3) which is ON state enabling recovery (by on/off control of the mode switching switch 16 or the like in FIG. 1).

In FIG. 3, (4) Initial state (POR: Power On Reset) and (5) Inactive state are also described as additional states. The reason being: it is generally not sufficient only to provide wiring between a host or the like and memory units. Therefore, on the assumption that a connection is established, an address space is initialized and determined and the initial state of each memory unit is set. However, the additional state of (4) is not necessarily essential in the technical idea of the present invention. Realization of the whole operation becomes possible when at least three kinds of states (operation modes) are set after initialization. If a fault occurs during operation in each of the states of (1), (2) and (3), the memory unit gets into the state of (5). If the memory unit recovers, the memory unit is synchronized with a memory unit operating in the state of (1), transitioning to the state of (5), to the state of (4), to the state of (3), to the state of (2). If a fault occurs in a memory unit which is in the state (1), then a memory unit in the state (2) immediately transitions to the state (1).

Figure 4:
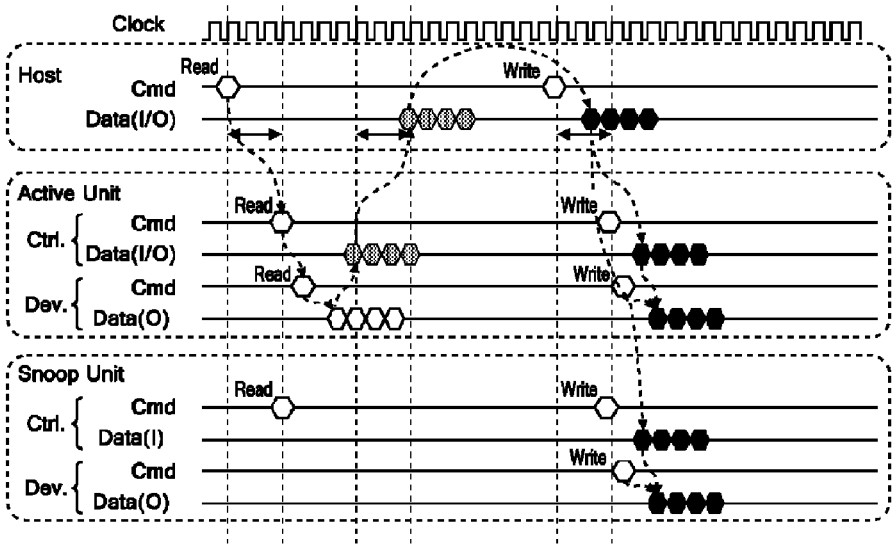
FIG. 4 is a diagram showing a timing chart of a memory recovery operation in a state that a host and two memory units are electrically connected, as a conventional technique.

FIG. 4 is a diagram showing a timing chart of a memory recovery operation in a state that a host and two memory units are electrically connected, as a conventional technique. If the "loop" is not formed as in conventional techniques, data read by a read command returns to a host once, and a write command is issued by the host again after the return process. This process is called RMW (Read-Modify-Write). A clock is responsible for timing of a command and data read in response to the command. At least one clock is required for the process of transmission from a host to an IO controller and then to a memory device. However, this timing chart is only an example and is not necessarily required for the process to function (to cause the process to operate).

Figure 5:
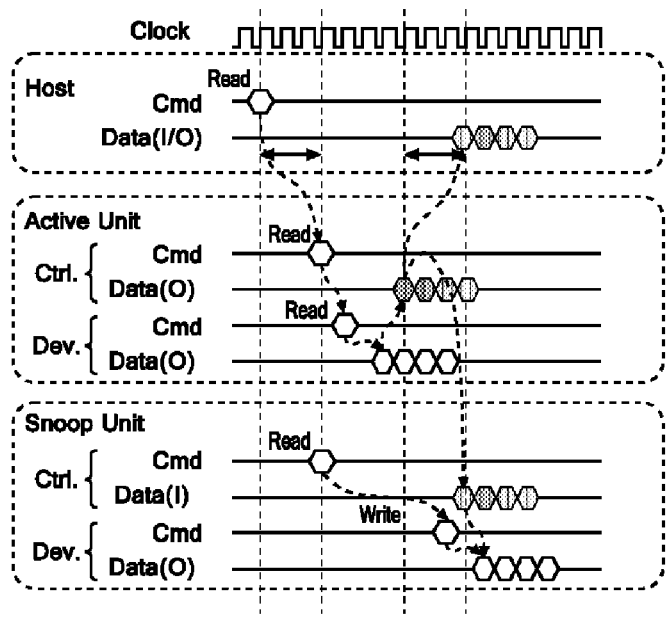
FIG. 5 is a diagram showing a timing chart of a memory recovery operation in a state that a host and two memory units are optically connected (via a "loop" without returning to the host), as used by the present invention.

FIG. 5 is a diagram showing a timing chart of a memory recovery operation in a state that a host and two memory units are optically connected via a "loop" without returning to the host, as in the present invention. Since the "loop" of the present invention is formed, it is possible to simultaneously transmit a read command to two IO controllers without returning to a host and transmit read data to the other IO controller (at a faster timing because it is unnecessary to return to the host). In other words, since it becomes possible to perform writing to a new memory during a read cycle by a read command, a write cycle (time for separately issuing a write command) by an IO controller becomes unnecessary as a result, and it is possible to decrease recovery time by roughly half.

Figure 6:
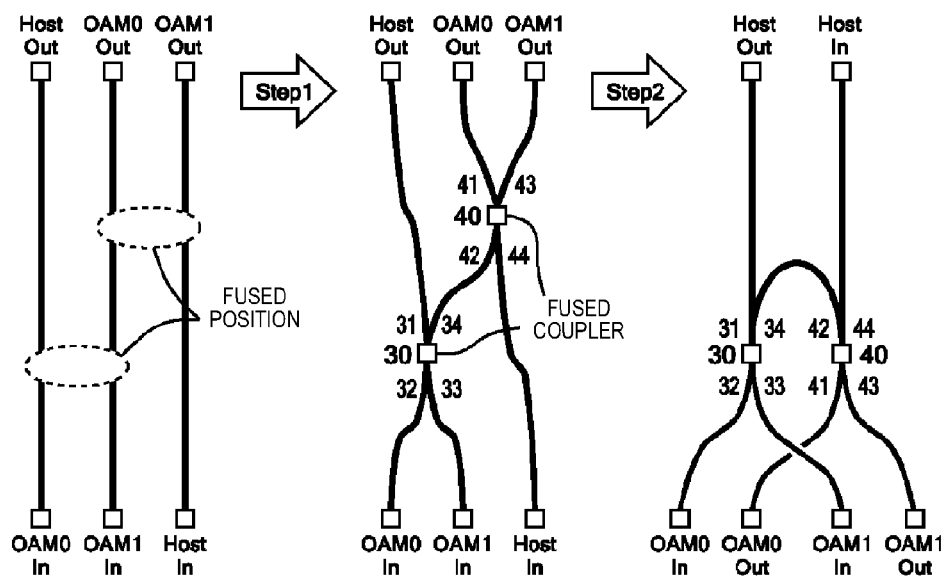
FIG. 6 is a diagram showing an optical link creation method as used by the present invention, wherein the optical links are those adopted as the optical interconnects in FIG. 2, and the same reference numerals as those in FIG. 2 are given.

FIG. 6 is a diagram showing an optical link creation method as in the present invention. In this example, the optical links are those adopted as the optical interconnects in FIG. 2, and the same reference numerals as those in FIG. 2 are given. Host Out indicates that the position is connected to the transmission end of a host. As can be easily imagined from a final form created after Steps 1 and 2, Host In indicates that the position is connected to the receiving end (Rx) of the host. OAM0 In indicates that the position is connected to the receiving end (Rx) 212 of the memory unit 200. OAM0 Out indicates that the position is connected to the transmission end (Tx) 214 of the memory unit 200. OAM1 In indicates that the position is connected to the receiving end (Rx) 412 of the memory unit 400. OAM1 Out indicates that the position is connected to the transmission end (Tx) 414 of the memory unit 400. OAM is an abbreviation of Optical Attachment to Memory (Unit).

By making the lengths of three fibers or the distances up to fusion positions uniform, it is possible to make the delay timings of the optical links uniform. At Step 1, optical links are completed only by fusing the three fibers at two fusion positions (a first position at a first distance from one end of the fibers and a second position at a second distance (which is different from the first position)). Patent Literature 3 shows a general technical level for realizing the fusion. In actually applying the present invention, the upper part and the lower part can be reversed, with the "loop" formed from the fourth branch 42 of the coupler 40 to the second branch 34 of the coupler 30 as the center, as shown as Step 2. The present invention is applicable to a connection relationship corresponding to the optical interconnect in FIG. 2. It should be noted that Patent Literature 3 does not disclose that the three fibers are bundled, being fused at different positions.

Figure 7:
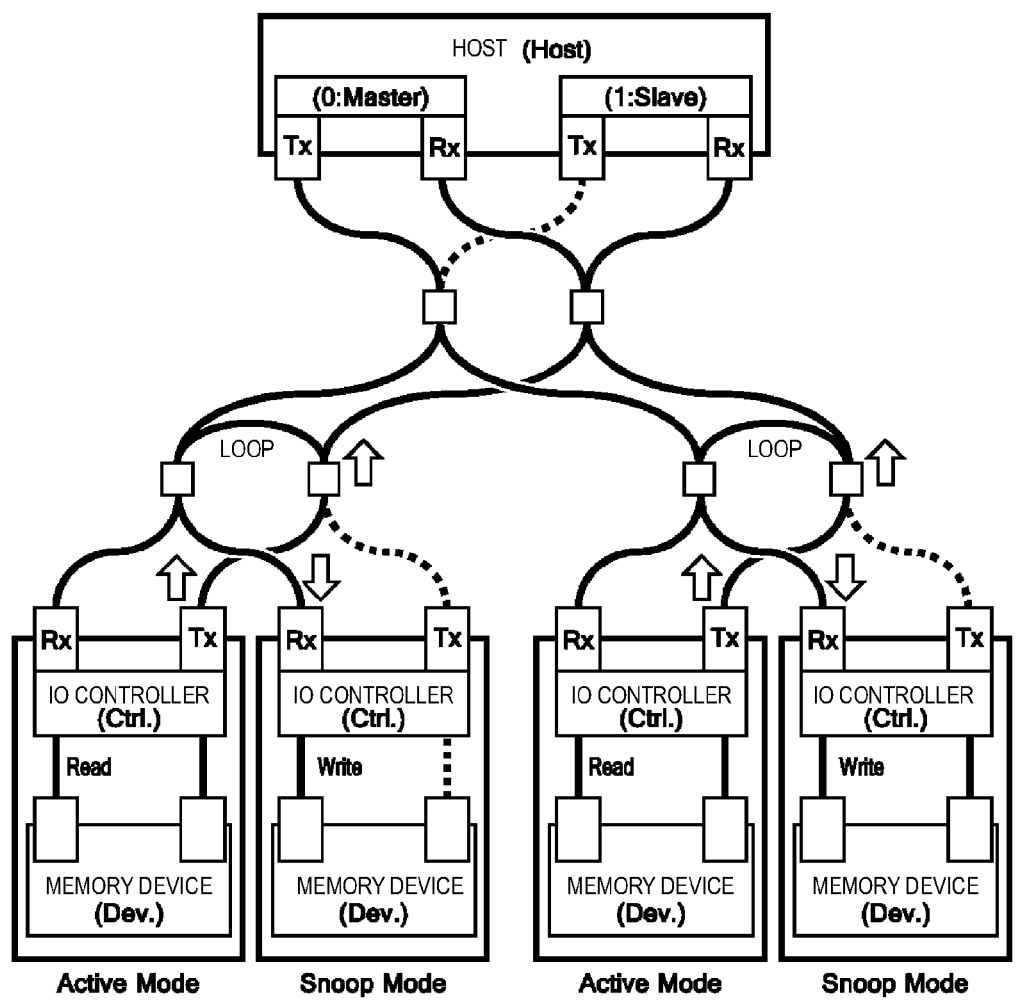
FIG. 7 is a diagram showing an example of connection configured in a further developed state.

FIG. 7 is a diagram showing an example of a connection configured in a further developed state. In comparison with FIG. 2, connections are configured in layers. A host-side PHY (physical layer, first layer) is duplicated with Master (an abbreviation of M or 0) and Slave (an abbreviation of S or 1) to enhance redundancy. A loop is configured in a coupler on the memory side. An example of a one-stage drop is shown here. However, a multiple-stage drop is also applicable. In this wiring example, double memory capacity is realized by using two memory units by the drop.

Figure 8:
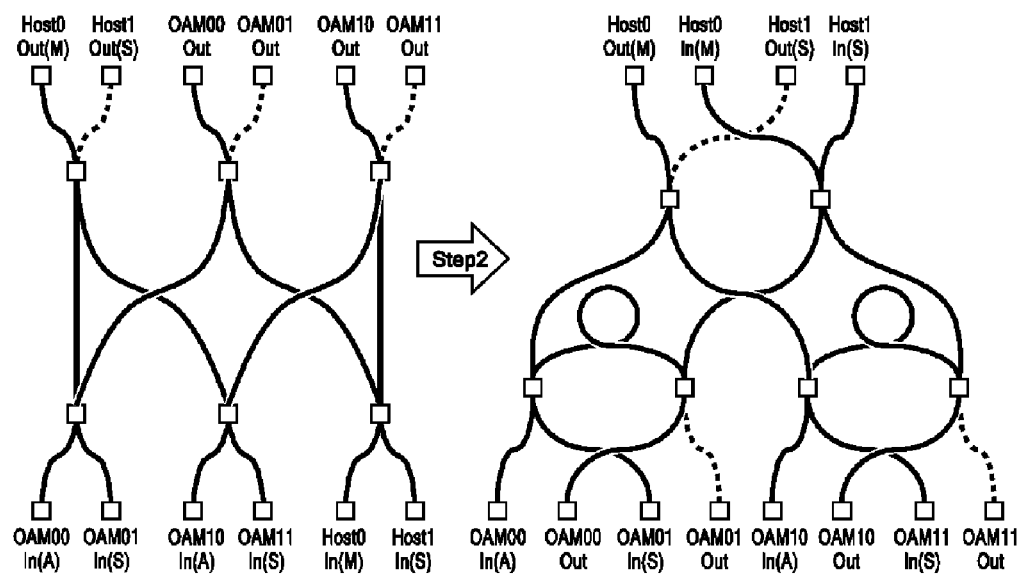
FIG. 8 is a diagram showing an optical link creation method realizing the connection in the developed configuration in FIG. 7, in accordance with the present invention.

FIG. 8 is a diagram showing an optical link creation method realizing the connection in the developed configuration in FIG. 7, in accordance with the present invention. The creation of an optical link described with reference to FIG. 6 can be developed.

What is claimed is:

1. A connection scheme from a host to multiple memory devices via an optical link comprising:
    a host, comprising a transmitting end for transmitting commands and a receiving end for receiving commands;
    two or more optical couplers,
    wherein a first optical coupler has a third branch that is optically linked to said receiving end of said host and a fourth branch that is optically linked to a second branch of a second optical coupler,
    wherein said second optical coupler also has a first branch that is optically linked to said transmitting end of said host;
    two or more input/output (IO) controllers, each comprising a transmission end and a receiving end,
    wherein said transmission end of said first IO controller is optically linked to a first branch of said first optical coupler, said transmission end of said second IO controller is optically linked to a second branch of said first optical coupler, said receiving end of said first IO controller is optically linked to a third branch of said second optical coupler, and said receiving end of said second IO controller is optically linked to a fourth branch of said second optical coupler; and
    two or more memory devices each connected to one of said IO controllers via an input and an output, wherein said IO controllers, in accordance with at least one of a read command and a write command given from said transmission end of said host, perform selective transitions between active mode and snoop mode, and between snoop mode and recovery mode.

2. The connection scheme according to claim 1,
    wherein said first IO controller is in active mode and said second IO controller is in snoop mode,
    wherein data is read from said memory device of said first IO controller,
    wherein said data is transmitted from said transmission end of said first IO controller to said first branch of said first optical coupler,
    wherein said data is transmitted from said fourth branch of said first optical coupler to said second branch of said second optical coupler without returning said data to said host,
    wherein said data is transmitted from said fourth branch of said second optical coupler to said receiving end of said second IO controller, and
    wherein said data is written to said memory device of said second IO controller.

3. The connection scheme according to claim 1,
    wherein said IO controller and said memory device together comprise a memory unit, and a fault occurs while said IO controller is operating said memory unit in active mode,
    wherein a memory unit in snoop mode is activated immediately by transitioning it into active mode,
    wherein said memory unit with said fault is inactivated by transitioning it into an inactive state,
    wherein said memory unit now in an inactive sate is initialized by transitioning it into an initial state,
    wherein said memory unit now in an initial state is synchronized with a memory unit in active mode by transitioning said memory unit in said initial state into recovery mode, and
    wherein said memory unit in recovery mode is transitioned to snoop mode.

4. The connection scheme according to claim 1,
    wherein said IO controller and said memory device together comprise a memory unit, and a fault occurs while said IO controller is operating said memory unit in snoop mode,
    wherein said memory unit with said fault is inactivated by transitioning it into an inactive state,
    wherein said memory unit now in an inactive sate is initialized by transitioning it into an initial state,
    wherein said memory unit now in an initial state is synchronized with a memory unit in active mode by transitioning said memory unit in said initial state into recovery mode, and
    wherein said memory unit in recovery mode is transitioned to snoop mode.

5. The connection scheme according to claim 1, further comprising: at least one of a mode switching switch and a network interface, for enabling selective transitioning among said modes.

6. The connection scheme according to claim 1, wherein said IO controller and said memory device comprise a memory unit.

7. The connection scheme according to claim 1, wherein said connection scheme is configured in at least a one-stage drop.

8. A method for connecting a host to two or more input/output (IO) controllers within two or more memory units through optical couplers via optical links, the method comprising:
    connecting via an optical connection a receiving end of said host and a third branch of a first optical coupler, a fourth branch of said first optical coupler and a second branch of a second optical coupler, and a first branch of said second optical coupler and a transmission end of said host;
    connecting via an optical connection a transmission end of a first IO controller to a first branch of said first optical coupler;
    connecting via an optical connection said transmission end of said second IO controller to a second branch of said first optical coupler;
    connecting via an optical connection said receiving end of said first IO controller to a third branch of said second optical coupler;

connecting via an optical connection said receiving end of said second IO controller to a fourth branch of said second optical coupler;
connecting two or more memory devices to one of said two or more IO controllers via an input and an output; and
selectively transitioning said IO controllers between active mode and snoop mode, and between snoop mode and recovery mode in accordance with at least one of a read command and a write command given from said transmission end of said host.

9. The method according to claim 8, wherein said first IO controller is in active mode and said second IO controller is in snoop mode, the method further comprising:
reading data from said memory device of said first IO controller,
transmitting said data from said transmission end of said first IO controller to said first branch of said first optical coupler;
transmitting said data from said fourth branch of said first optical coupler to said second branch of said second optical coupler without returning said data to said host;
transmitting said data from said fourth branch of said second optical coupler to said receiving end of said second IO controller; and
writing said data to said memory device of said second IO controller.

10. The method according to claim 8, wherein said IO controller and said memory device together comprise a memory unit, and a fault occurs while said IO controller is operating said memory unit in active mode, the method further comprising:
activating immediately a memory unit in snoop mode by transitioning it into active mode;
inactivating said memory unit with said fault by transitioning it into an inactive state;
initializing said memory unit now in an inactive sate by transitioning it into an initial state;
synchronizing said memory unit now in an initial state with a memory unit in active mode by transitioning said memory unit in said initial state it into recovery mode; and
transitioning said memory unit from recovery mode to snoop mode.

11. The method according to claim 8, wherein said IO controller and said memory device together comprise a memory unit, and a fault occurs while said IO controller is operating said memory unit in snoop mode, the method further comprising:
inactivating said memory unit with said fault by transitioning it into an inactive state;
initializing said memory unit now in an inactive state by transitioning it into an initial state;
synchronizing said memory unit now in an initial state with a memory unit in active mode by transitioning said memory unit in said initial state into recovery mode; and
transitioning said memory unit from recovery mode to snoop mode.

12. The method according to claim 8, further comprising: enabling selective transitioning among said modes by using at least one of a mode switching switch and a network interface.

13. The method according to claim 8, wherein additional IO controllers, memory devices, and optical couplers are added, further comprising: configuring said additional IO controllers, memory devices, and optical couplers into at least a one-stage drop.

* * * * *